Dec. 14, 1937.  C. F. DINLEY  2,101,841
DEGREASING APPARATUS
Filed Feb. 7, 1935  4 Sheets-Sheet 1
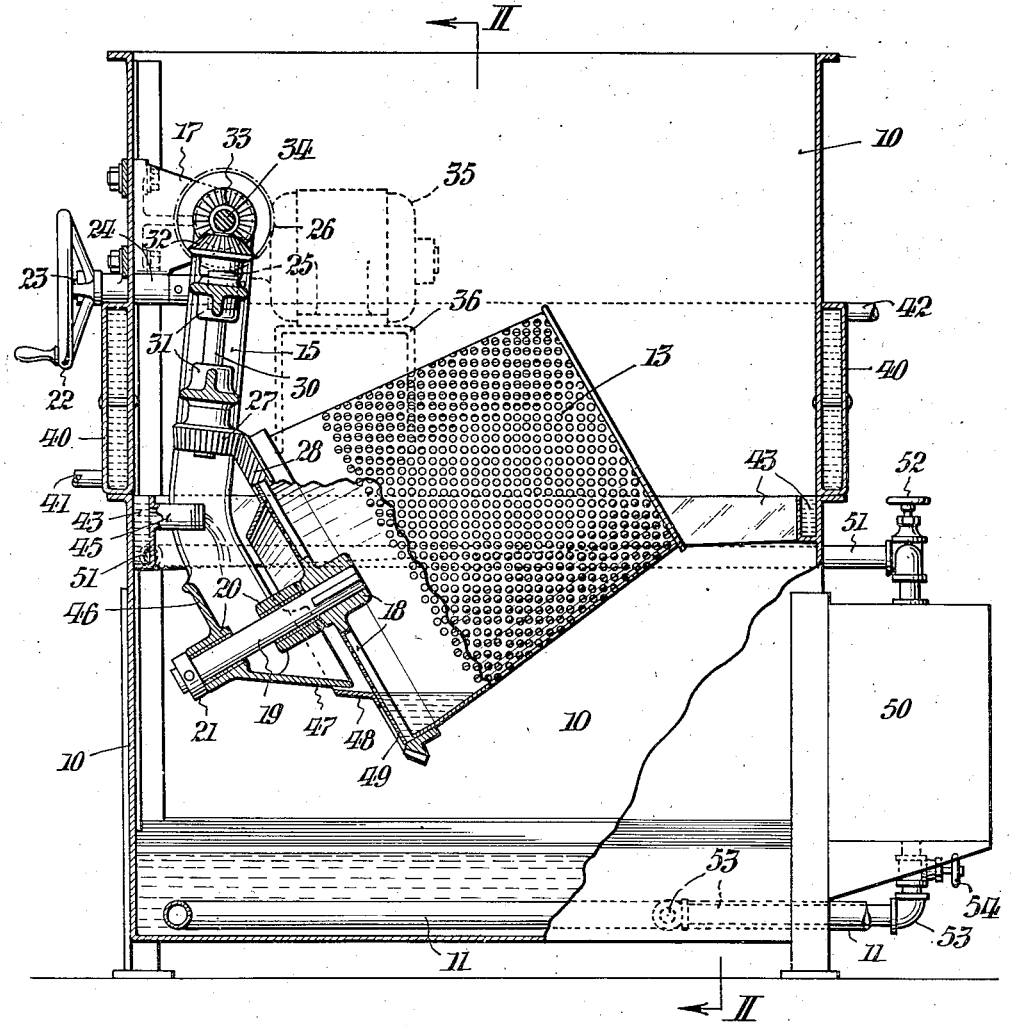
FIG_I_
WITNESSES:
Hubert Fuchs
William Bell, Jr.
INVENTOR:
Clarence F. Dinley,
BY Fraley&Paul
ATTORNEYS.

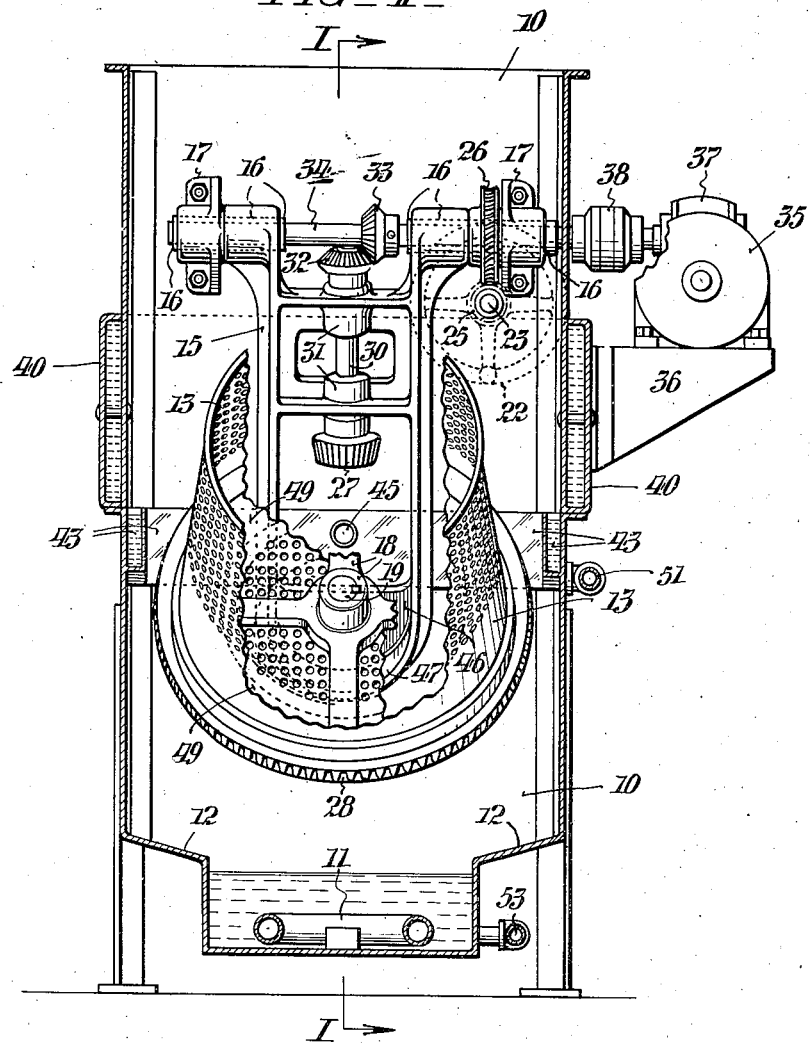

Dec. 14, 1937.  C. F. DINLEY  2,101,841
DEGREASING APPARATUS
Filed Feb. 7, 1935  4 Sheets-Sheet 3
FIG. III
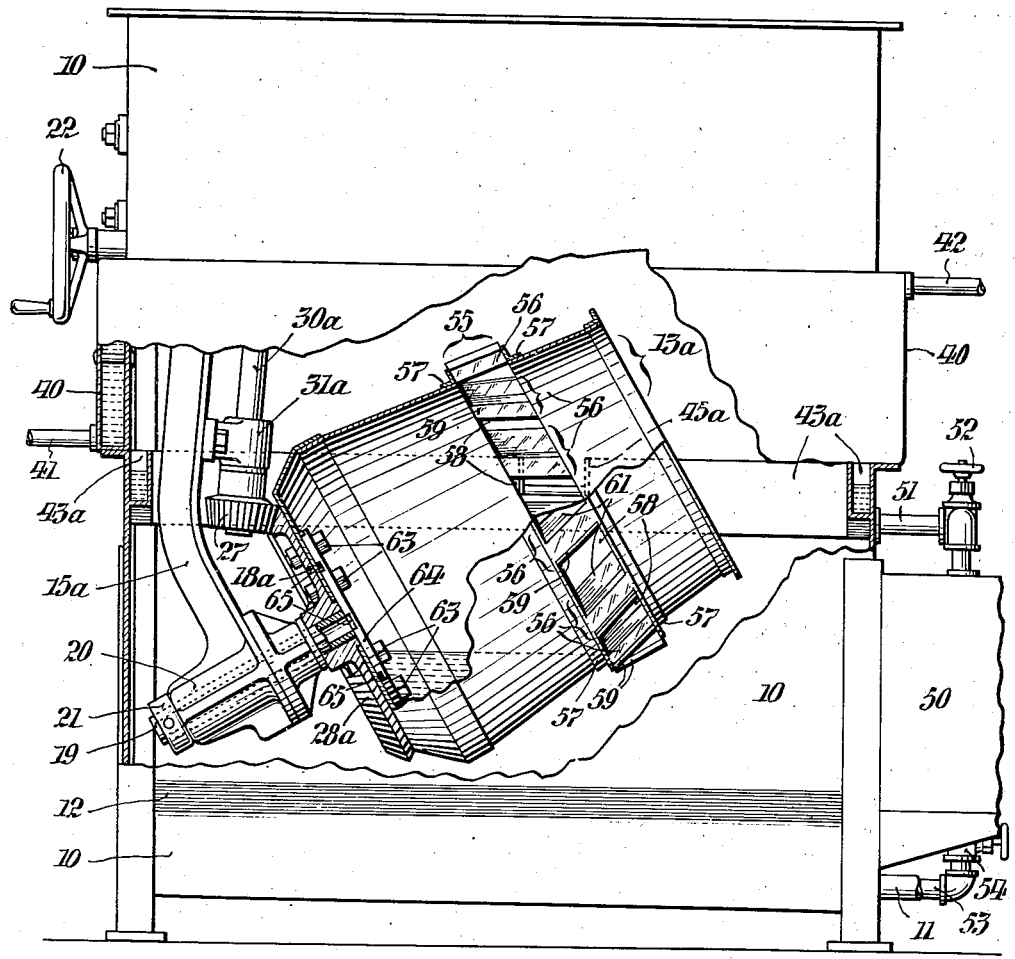
WITNESSES:
Hubert Fuchs
William Bell, Jr.
INVENTOR:
Clarence F. Dinley,
BY Falley Paul
ATTORNEYS.

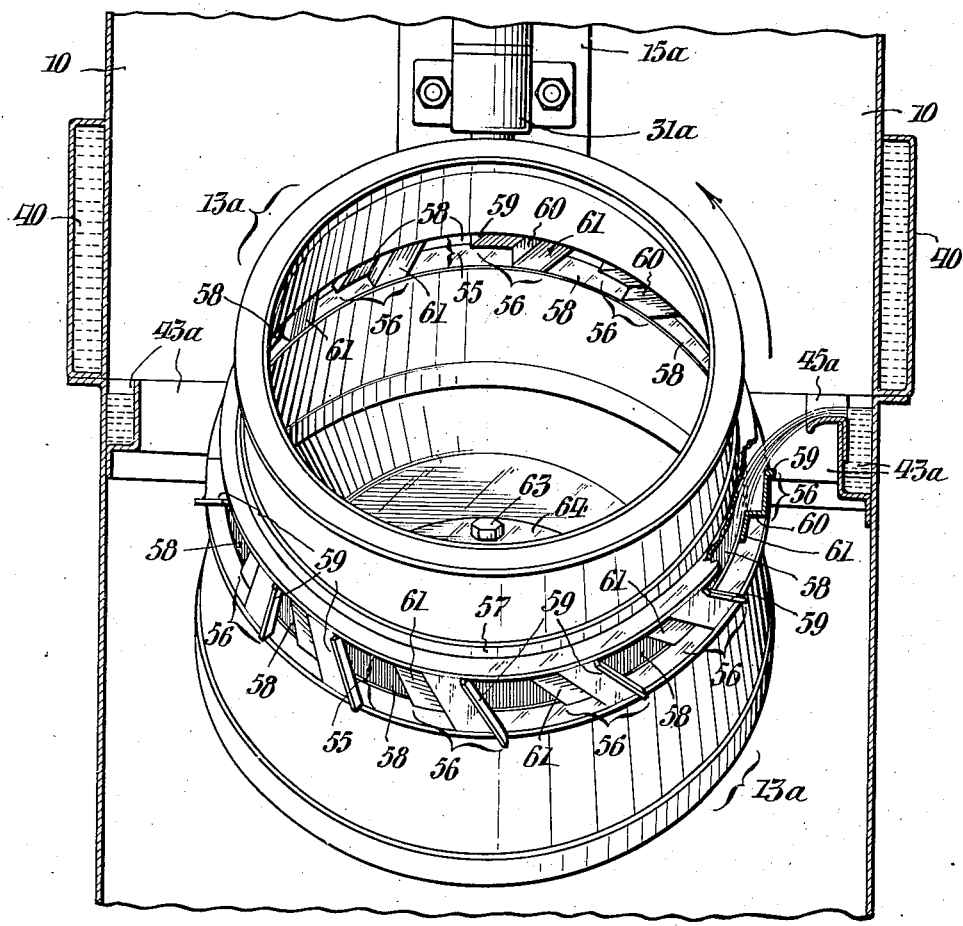

Patented Dec. 14, 1937

2,101,841

UNITED STATES PATENT OFFICE 2,101,841

DEGREASING APPARATUS

Clarence F. Dinley, Detroit, Mich., assignor to James H. Bell, Philadelphia, Pa.

Application February 7, 1935, Serial No. 5,385

8 Claims. (Cl. 87—6)

My invention relates to treatment with solvents for such purposes as cleaning and degreasing, and to the use of volatile solvents. It is useful for cleaning metal parts or objects preparatory to electroplating, enamelling, painting, and other finishing operations, and is especially adapted and advantageous for treating large quantities of small articles in bulk. Various solvents whose vapors are heavier than air may be used, such as benzine; benzol; and chlorinated solvents like carbon tetrachloride, trichloromethane, dichlorethane, tetrachlorethane, trichlorethylene, and tetrachlorethylene, whose vapors are uninflammable. The work may be treated with the liquid solvent or with the solvent vapor, or both; and in some cases, treatment in boiling liquid solvent is desirable. In suitable forms of embodiment, such as hereinafter described, my invention affords a compact and efficient machine, semi-automatic in operation, wherein large quantities of work can be rapidly, thoroughly, and economically cleaned, with small labor cost and little loss of solvent. Various other features and advantages of the invention will appear from the description hereinafter of species thereof, and from the drawings.

In the drawings,

Fig. I is a side view of one preferred form of apparatus suitable for the purposes of my invention, mainly in vertical section as indicated by the line and arrows I—I in Fig. II.

Fig. II is a side or end view from the right of Fig. I, with various parts in vertical section as indicated by the line and arrows II—II in Fig. I.

Fig. III is a view similar to Fig. I, illustrating a somewhat different form of apparatus.

Fig. IV is a fragmentary view of the treating vessel and the revolving tumbling vessel of Fig. III, from the right of that figure, the treating vessel being in vertical section, and a portion of the tumbling vessel being broken out.

The apparatus shown in Figs. I and II comprises a sheet metal treating vessel or enclosure 10 that contains the solvent, whether used as liquid or as vapor, and is closed to exclude air and retain any solvent vapor that may be present,—purposely or incidentally,—but is preferably open upward for the introduction and removal of work. In general, work is treated with liquid or vaporous solvent (or both) in the lower part of the vessel 10, while its upper portion serves mainly to prevent or minimize loss of solvent vapor from the vessel, especially in drying the work after treatment with the solvent. For when the solvent employed is highly volatile like gasoline or benzine; or when the work is immersed in the solvent while itself still hot or warm; or when the solvent is used hot or even boiled during use; or when the solvent is purposely used in the vapor state; or when the work is allowed to drain or dry in the upper portion of the vessel after treatment with the solvent;— in all such cases, solvent vapor will be present, and will tend to accumulate to the point of overflowing over the upper edge of the vessel 10. As here shown, the vessel 10 is provided with heating means, such as a steam coil 11 near its bottom, for heating, vaporizing, or even boiling the liquid solvent in the vessel. The escape of solvent vapor thus or otherwise present in the vessel 10 may be prevented by suitable upward extension of its walls, and by condensation of the vapor from the upper part of the vessel. The lowermost portion of the vessel 10 (that contains the heating means 11) may be narrowed or contracted, on a slope 12 downward and inward from either side, as best shown in Fig. II.

For treating the work in the vessel 10, there is shown a container or drum 13, preferably foraminous at least in part, and preferably arranged to revolve and tumble the work. This is particularly useful for treating quantities of small articles at once, since by tumbling the articles in contact with the solvent, they can be thoroughly cleaned all over much more rapidly than if they were dealt with singly, and at much lower cost. The drum or tumbling barrel 13 is shown as frustro-conical, with the smaller end up. It is revolubly mounted on a supporting structure in the form of an arm 15, that can be swung down and up, into and out of the vessel 10, about a (horizontal) axis at or near the top of the vessel, at one end thereof; and its axis of revolution extends transversely to the axis of swing. As shown, the arm 15 has (hollow) trunnions 16, 16 that turn in bearing brackets 17 projecting inward from the left-hand end wall of the vessel 10. The drum 13 has at its bottom a spider 18 in which is secured (keyed fast) a spindle 19 that revolves in bearings 20, 20 on the lower end of the arm 15. Withdrawal of the spindle 19 from the bearings 20, 20 is prevented by a collar 21 keyed fast to the lower end of the spindle. When the arm 15 is in its extreme lower position at the left-hand end of the vessel 10, as in Fig. I, the axis of revolution of the drum 13 (represented by the spindle 19) is inclined upward to the right, as at about a 30° angle to the horizontal. As the drum or barrel 13 revolves in lowered position, work in the barrel gravitates and tumbles against its bottom end.

While the arm 15 and drum 13 may be swung up and down by taking hold of the arm with the hand, or in any other suitable way, a more convenient mechanical means for doing this is shown. Outside the vessel 10, at the left of Fig. I, is a hand and crank wheel 22 on the outer end of a short (horizontal) shaft 23 which can revolve in a bearing bracket 24 mounted on the vessel wall (Fig. I), and extends in through the wall below the right-hand trunnion 16 (Fig. II). The shaft 23 may be connected to the arm 15 by any suitable means, here shown as a worm 25 on the inner end of the shaft in mesh with a worm wheel 26 keyed fast on the right-hand trunnion 16. By turning the wheel 22 one way or the other, the arm 15 and drum axis 19 may be swung up through a substantial angle, even as much as 180° or more, from its position shown in Fig. I (as far as permitted by the upper edge of the vessel 10 at the left), or returned downward to the position of Fig. I.

The drum 13 may be driven and revolved by any desired means, such for example, as a suitably driven bevel pinion 27 meshing with a bevel gear 28 formed on the rim of the spider 18. As shown in Figs. I and II, the pinion 27 is keyed fast on the lower end of a shaft 30 mounted to revolve in bearings 31, 31 on the arm 15, and having another bevel pinion 32 keyed fast on its upper end. This pinion 32 meshes with a bevel pinion 33 keyed fast on a (horizontal) drive shaft 34 revolving coaxially with the trunnions 16, 16, which are hollow and are provided with internal bearings for the shaft 34. The shaft 34 may extend (preferably with a fluid-tight joint or packing) out through the side wall of the vessel 10 that is at the rear in Fig. I, and to the right in Fig. II; and it may be driven by any suitable means, such as an (electric) motor 35 mounted on a bracket 36 attached to the rear side of the vessel 10 (Fig. I),—preferably through a reduction gearing 37 and a universal joint 38 of any suitable type. Thus the drum 13 can be driven by the motor 35 when in its lowermost position shown in Fig. I, or when swung up 180° or more over the (left-hand) upper edge of the vessel 10, or when merely swung up into the upper part of the vessel without raising the work above the upper edge,—or, indeed, in any position within its extreme range of movement. Also, the drum 13 can be swung up or down, as desired, while revolving, as well as when stationary.

Condensation of vapor from the upper portion of the vessel 10 may be effected by the external atmospheric cooling of the walls, if they are of sufficient height; though generally it is preferable to supplement or (largely) replace atmospheric cooling with more effective cooling means, so that the vessel 10 need not be so deep as mere atmospheric cooling would require. The particular type and arrangement of cooling means— whether internal or external, and whether on one side, two or more sides, or all around the vessel 10—is broadly immaterial, except that the greater the extent of the cooling means perimetrically of the vessel, the less its extent vertically need be to give adequate exposed cooling area. The solvent vapor, being heavier than air, will always flow by gravity toward the region or area where it is most rapidly cooled and condensed,—just as if there were an actual outlet for the vapor at such region. As here shown, the upper vessel walls are (externally) waterjacketed at 40 all the way around a zone which is considerably above the bottom of the vessel and also a good deal below its top. The jacket 40 has an inlet 41 for water or other cooling medium at its lower edge on one end of the vessel 10, and an outlet 42 at its upper edge on the other end of the vessel. The pure liquid solvent condensed on the vessel walls by the cooling jacket 40 runs down into a trough 43, preferably extending all around the vessel. As shown in Fig. I, the bottom of the trough 43 slopes downward from the right-hand end of the vessel toward its left-hand end. When the work in the drum 13 is to be cleaned in the main body of liquid solvent in the bottom of the vessel 10, or when it is to be treated only with solvent vapor, the condensate may be allowed to overflow the upper edge of the trough 43 and run down into the main body of liquid in the vessel. When, however, it is desired to treat the work in the drum 13 with a pure liquid condensate, the latter may be delivered from the trough 43 directly into the drum 13 upon the work therein. For this purpose, there is shown in Figs. I and II a short spout or nipple of pipe 45 connected through the side of the trough 43 at the left-hand side of the vessel and projecting over the upper edge of a conduit (trough) 46 with which the swinging arm 15 is provided. The lower end of the conduit 46 has a lip 47 that closely overlies a frusto-conical flange 48 on the bottom wall 49 of the drum 13. Inside this flange 48, the drum bottom 49 is foraminous or perforated to admit the solvent from conduit 46 freely; but the portion of the drum bottom 49 outside the flange 48 and the lower portion of the peripheral drum wall may preferably be solid, to retain a pool of the solvent about to the level shown in Fig. I. Above this level, the peripheral drum wall may be foraminous or perforated. By the conduit 46 and the parts 47 and 48, liquid condensate collecting in the trough 43 is automatically received, conveyed, and delivered from the trough spout 45, through the openings in the drum wall 49, to the work in the drum 13, as the latter revolves. When not in use, the spout or nipple 45 can be closed by means of a screw cap (not shown).

As shown in Fig. I, a liquid solvent storage reservoir or tank 50 is externally mounted on the (right-hand) end of the vessel 10. A supply pipe 51 with a stop valve 52 interposed therein connects the top of the reservoir 50 with the low point of the trough 43 at the left-hand end of the vessel 10, and a return pipe 53 with a stop valve 54 interposed therein connects the bottom of the reservoir 50 with the lower portion of the vessel 10.

Various modes of operation and use of the apparatus will be apparent from the foregoing description. If only a rather crude cleaning is required, the vessel 10 may be filled with liquid solvent (which may be heated by means of the steam pipe 11) up to a level a little below the trough 43, and the work may be tumbled immersed in this liquid solvent, with the drum 13 in the position of Fig. I. In this case, the pipe 45 may be either open or closed. If the work is but little soiled, the vessel 10 may be filled with liquid solvent only to about the level shown in Figs. I and II, below the drum 13; the solvent may be heated and boiled by the heating means 11; the pipe 45 may be closed; and the work may be cleaned by the solvent vapor condensing on it,— the work being in this case, of course, introduced into vessel 10 while itself comparatively cold.

Or if very thorough cleaning of fairly dirty work is required, this may be done with the purified condensed solvent from trough 43. In this case, one preferred mode of operation would be as follows:

The vessel 10 is filled with trichlorethylene or other volatile solvent about to the level shown in Figs. I and II. The solvent is heated and boiled by steam supplied to the heating device 11, and cooling water is preferably circulated through the jacket 40 to condense the solvent vapor,—which will thus be prevented from rising more than about mid-height of this condenser 11, and, a fortiori, from overflowing or escaping from the open vessel 10. In other words, the condenser 11 will draw and keep down the vapor level well below the top of the open vessel 10. The pipe 45 is left open, and the apparatus operated without any work until condensed solvent discharges freely from pipe 45.

The tumbling barrel or drum 13 may now be swung up, by means of the crank wheel 22, with its axis 19 about vertical, and its top end presented at or above the upper edge of the vessel 10, and a charge of dirty articles placed in the drum, filling it perhaps ¼ to ⅓ full, more or less. The drum 13 is returned to its position in Fig. I, and revolved (by the motor 35) in this position until the work is thoroughly cleaned by tumbling in the pure solvent continually supplied to the drum from the condenser 40 and trough 43; this may ordinarily require about 1 to 3 minutes per charge of articles to be cleaned. The drum 13 may then be raised higher in the vessel 10, so that liquid from the pipe 45 will no longer fall into the trough 46, and so that liquid in the drum may drain out through the holes in the bottom 49, inside the flange 48. After revolving in this position (preferably with the drum axis 19 nearly or about vertical) until the solvent has drained off from the work and the latter has dried off completely, the drum 13 may be swung on up and over, again presenting its top end at or above the edge of the vessel 10, as far as necessary to discharge its contents by gravity outside the vessel 10 at the left (Fig. I). The drum 13 may then be returned to charging position, and the cycle of operations may be repeated. The motor 35 may run continuously, or may be stopped when it is unnecessary to tumble the work.

If desired, of course, tumbling of the work—in contact with the solvent, or before or after treatment therewith—may be resorted to, or prolonged, in order to remove burrs, or to burnish the work, or the like.

When the solvent in the bottom of the vessel 10 becomes so contaminated with grease and dirt that cleaning is necessary, the valve 52 may be opened (and the pipe 45 closed if necessary) so as to deliver the pure condensed solvent from the trough 43 into the reservoir 50,—the valve 54 being closed when all (or approximately all) the solvent has thus been purified and distilled over into reservoir 50. The residue of dirt, grease, and solvent (if any) in the bottom of the vessel 10 may now be cleaned out,—the drum 13 being of course swung up out of the way to facilitate this. Then valve 54 may be opened to drain the pure solvent from reservoir 50 back into the bottom of vessel 10, valve 52 may be closed and pipe 45 opened, and any desired amount of fresh solvent may be added to the purified supply in vessel 10. Thereupon the apparatus is ready for operation as before.

Figs. III and IV illustrate somewhat different arrangements for introducing the purified condensed solvent into the revolving tumbling vessel 13a, above its bottom, instead of through the latter. For this purpose, the drum 13a is shown apertured at 55 in a circular peripheral zone, and preferably provided with additional collecting or receiving means for liquid overflow from the trough 43a, which has a spout 45a at its low point at one side of the vessel 10. The liquid-receiving means here shown for the drum 13a comprises a series of external bucket or pocket-like vanes 56 of sheet metal. These are formed out of a channel section having flanges 57, 57 welded to the exterior of the drum 13a, and openings 58 in the channel web. The vane-portions 56 of the channel web between the openings 58 have outturned lips 59 and inturned portions 60 that form the "bucket" bottoms; and these portions 60 have flanges 61 in the general plane of the frusto-conical barrel wall. In the present instance, the portions of the bucket wall at opposite sides of the opening 55 are interconnected entirely by the vanes 56. The bucket vanes 56 automatically receive the liquid condensate collected in the trough 43a from its spout 45a and, as the drum 13a revolves, automatically convey and deliver it through the drum wall openings 55 to the work in the drum.

As shown in Fig. III, the spider 18 of Figs. I and II is replaced by a solid disc 18a whose periphery embodies the gear 28a, and the drum bottom is clamped by bolts 63 between this disc and another disc 64 inside the drum. The arm 15a is of a simple T-section, with bearing 31a for the drum-driving shaft 30a mounted on its side adjacent the drum 13a.

As shown in Fig. IV, the drum 13a revolves counterclockwise, so that the bucket-vanes 56 rise toward the spout 45a. Pure liquid solvent falling into the buckets 56 from the spout 45a is delivered through the openings at 55 into the interior of the drum 13a, on the work tumbled therein. As here shown, the drum 13a is not foraminous, but solid-walled, so that liquid solvent normally stands therein up to the level of overflow determined by the low point of the openings 58, at the underside of the revolving drum. When the drum 13a is raised about to the level of the condenser 43a with its bottom horizontal and its hollow spindle axis 19a vertical, solvent inside the drum can drain out completely through the spindle 19a (Fig. III) and the radial slots or grooves 65 in the disc 64, leading inward from the periphery of the disc to the opening in the spindle 19a.

In Figs. III and IV, various parts and features are marked with the same reference numerals as the corresponding ones in Figs. I and II, as a means of dispensing with repetitive description — distinguishing letters being added where such distinction appears necessary.

Having thus described my invention, I claim:

1. Apparatus of the character described, for tumbling and treating objects with volatile solvent whose vapor is heavier than air, comprising in combination an air-excluding treating vessel, for containing liquid solvent and its vapor, open at its upper portion; an arm swingable down and up, and a tumbling barrel revolubly mounted on said arm and swinging therewith down and up into and out of the vessel; means for driving said tumbling barrel when swung down into the vessel; means for retaining and condensing solvent vapor evolved in the vessel, and thus preventing its overflow therefrom; and means for delivering the condensate to the work in the revolving vessel, including a collecting trough on the vessel wall, and a conduit on said arm receiving the condensate from said trough and discharging it into the vessel upon the work therein.

2. Apparatus of the character described, for tumbling and treating objects with volatile solvent whose vapor is heavier than air, comprising in combination an air-excluding treating vessel, for containing liquid solvent and its vapor, open at its upper portion; a supporting structure swingable down and up, and a tumbling barrel revolubly mounted on said structure and swinging therewith down and up into and out of the vessel; means for driving said tumbling barrel when swung down into the vessel; means for retaining and condensing solvent vapor evolved in the vessel, and thus preventing its overflow therefrom; and means for delivering the condensate to the work in the revolving vessel, including a collecting trough on the vessel wall, and collecting means on the peripheral barrel wall receiving overflow from said trough and delivering into the interior of the barrel.

3. Apparatus of the character described, for tumbling and treating objects with volatile solvent whose vapor is heavier than air, comprising in combination an air-excluding treating vessel, for containing liquid solvent and its vapor, open at its upper portion; a supporting structure swingable down and up, and a tumbling barrel revolubly mounted on said structure and swinging therewith down and up into and out of the vessel; means for driving said tumbling barrel when in the vessel; means for retaining and condensing solvent vapor evolved in the vessel and thus preventing its overflow therefrom; and means for delivering the condensate to the work in the revolving barrel, including a collecting trough on the vessel wall and conduit means delivering from said trough into the barrel.

4. Apparatus of the character described, for tumbling and treating objects with volatile solvent whose vapor is heavier than air, comprising in combination an air-excluding treating vessel, for containing liquid solvent and its vapor, open at its upper portion; a supporting structure swingable down and up, and a tumbling barrel revolubly mounted on said structure and swinging therewith down and up into and out of the vessel; means for driving said tumbling barrel when in the vessel; means for retaining and condensing solvent vapor evolved in the vessel and thus preventing its overflow therefrom; and means for delivering the condensate to the work in the revolving barrel, including a collecting trough on the vessel wall and conduit means carried by said supporting structure receiving condensate from said trough and delivering into the barrel.

5. Apparatus of the character described, for tumbling and treating objects with volatile solvent whose vapor is heavier than air, comprising in combination an air-excluding treating vessel, for containing liquid solvent and its vapor, open at its upper portion; a supporting structure swingable down and up, and a tumbling barrel revolubly mounted on said structure and swinging therewith down and up into and out of the vessel; means for driving said tumbling barrel when in the vessel; means for retaining and condensing solvent vapor evolved in the vessel and thus preventing its overflow therefrom; and means for delivering the condensate to the work in the revolving barrel, including a collecting trough on the vessel wall and means carried by said barrel receiving condensate from said trough and delivering the same into the barrel.

6. Apparatus of the character described, for tumbling and treating objects with volatile solvent whose vapor is heavier than air, comprising in combination an air-excluding treating vessel, for containing liquid solvent and its vapor, open at its upper portion; a supporting structure swingable down and up, and a tumbling barrel revolubly mounted on said structure and swinging therewith down and up into and out of the vessel; means for driving said tumbling barrel when in the vessel; means for retaining and condensing solvent vapor evolved in the vessel and thus preventing its overflow therefrom; and means for collecting and delivering the liquid condensate; and means swinging with said supporting structure and barrel for receiving the condensate from said last-mentioned means, and conveying and delivering it to the work in the barrel.

7. Apparatus of the character described, for tumbling and treating objects with volatile solvent whose vapor is heavier than air, comprising in combination an air-excluding treating vessel, for containing liquid solvent and its vapor, open at its upper portion; a supporting structure swingable about an axis down and up, and a tumbling barrel mounted and arranged on said supporting structure to revolve about an axis that is transverse to the axis of swing and itself swings with said structure from a lower position with the barrel in the vessel, where work in the barrel gravitates and tumbles against its bottom end as the barrel revolves, through a substantial angle, to an upper position where the other end of the barrel is presented above an edge of the vessel to discharge or receive work; and means for retaining and condensing solvent vapor evolved in the vessel, and thus preventing its overflow therefrom.

8. Apparatus of the character described, for tumbling and treating objects with volatile solvent whose vapor is heavier than air, comprising in combination an air-excluding treating vessel, for containing liquid solvent and its vapor, open at its upper portion; a supporting structure swingable about an axis down and up, and a tumbling barrel mounted and arranged on said supporting structure to revolve about an axis that is transverse to the axis of swing and itself swings with said structure from a lower position with the barrel in the vessel, where work in the barrel gravitates and tumbles against its bottom end as the barrel revolves, through a substantial angle, to an upper position where the other end of the barrel is presented above an edge of the vessel to discharge or receive work; means for retaining and condensing solvent vapor evolved in the vessel and thus preventing its overflow therefrom; means for collecting the liquid condensate, and means for conveying and delivering it to the work in the revolving barrel.

CLARENCE F. DINLEY.